T. WINANS.
Running-Gear.
No 14,174.
Patented Jan. 29, 1856.
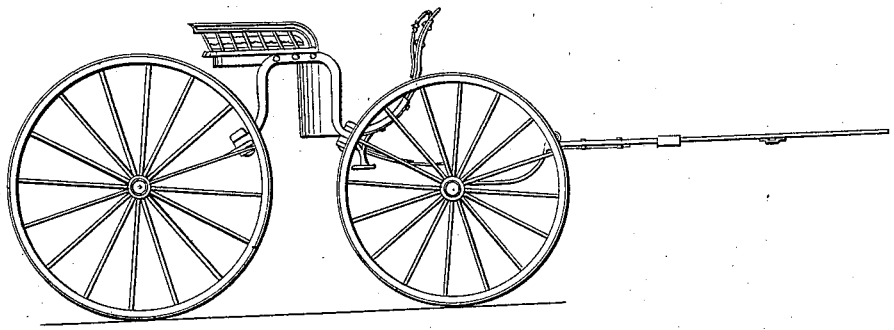
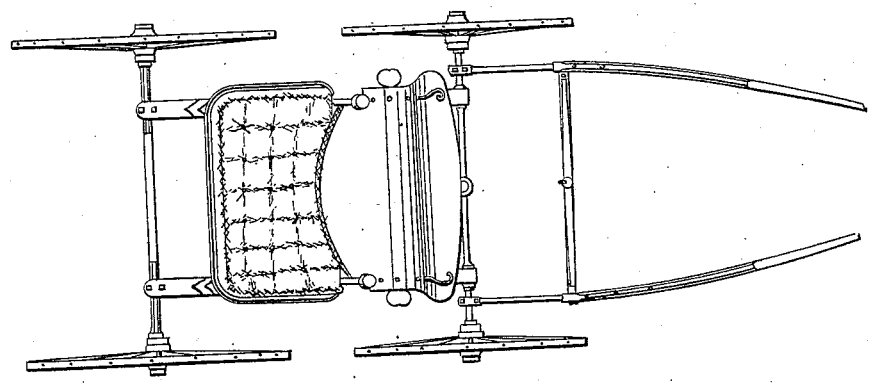
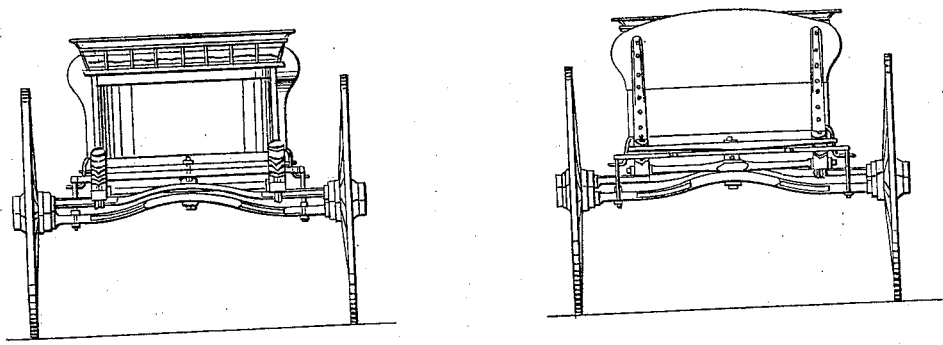

UNITED STATES PATENT OFFICE.

THOS. WINANS, OF BALTIMORE, MARYLAND.

BUGGY-WAGON.

Specification of Letters Patent No. 14,174, dated January 29, 1856.

*To all whom it may concern:*

Be it known that I, THOMAS WINANS, of Baltimore, Maryland, have invented a new and useful Improvement in the Construction of the Class of Wagons known as "Buggy-Wagons."

The objects I have in view are facility of turning short around and simplicity of construction while the ease of motion, size of wheels and weight of the ordinary buggy are preserved, the seat being neither objectionably high nor removed materially from what experience has shown to be its best position in relation to the axles.

The ordinary buggy wagon is a light carriage on four wheels with a seat for one or two persons. The springs commonly used are the ordinary elliptic springs though a buggy has been patented with single springs lengthwise of the vehicle, extending from the hind axle to the bolster over the front one. In the common buggy, the axles are kept together by a perch and hounds; in the other, the side springs supply the place of perch and hounds. But it is difficult to turn either of these buggies short around, the forward wheels striking against the body in the one case, and the springs, or body, in the other. Various other plans for turning short around have been patented all of which are more or less objectionable however, and none of them turn as short as is desirable and useful. For instance, the hind axle has been made to swivel in the opposite direction from the front one in the act of turning, by connecting the opposite sides of the front and back axles with connecting rods running diagonally from one to the other crossing in the center; the back axle having a swiveling point as well as the front one. In another patent, the front wheels swivel on a center, some distance back of the axle, which allows the axle to make a greater angle before the wheel comes in contact with the body, and consequently enables the wagon to turn shorter around than if the swiveling point were in the center of the axle as in the ordinary buggy. Both of the above constructions are objectionable, in consequence of the serpentine, or side, motion which the bodies take when the wheels come in contact with slight obstacles, and even from the motion of the shafts caused by the movement of the horse. The above are objections which my improvement overcomes.

*Turning short around.*—In making short turns it is necessary that the wheel should not come in contact with any part of the wagon, even though the pole or shafts be turned at right angles with the center line of the wagon, or still farther, so as to prevent the objectionable tendency of such contact to upset the vehicle or derange its parts. I accomplish this desideratum by allowing the wheel to pass under the seat and dispensing with the perch and hounds. To do this I place the seat upon two iron bars parallel to each other and running lengthwise of the wagon, bent, somewhat in the shape of the letter U inverted, with the extremities bent outward. To these I fasten the thick ends of what may be called half springs, the opposite, or thin, ends of which are attached to the hind axle and the bolster over the front axle respectively. The bent bars and springs thus form two side pieces, which are united by the seat, the hind axle, and front bolster. The construction of these side pieces is shown in the margin, where it is seen that each of the springs is like one half of the upper member of the common elliptic spring, with the long leaves placed at the bottom, and short ones on top.

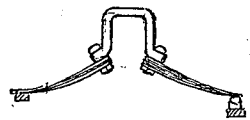

I am enabled to place the seat in the proper position between the axles while the wheel in turning is permitted to pass freely under it, by making the front of the seat concave and the back part of the foot board convex, the riser connecting the seat and foot board being only far enough within the circle described by the wheel, when the buggy turns round, to allow the necessary clearance. By this means while the front legs of the inverted U's allow the wheel to pass freely behind them, I am enabled to place the seat in a more desirable position between the axles than could be done without such curving of the seat and foot board, which is important. While my preferred mode of construction is to place the side pieces above described at or near the outer ends of the seat, yet the ends I have in view may nevertheless be obtained, to a useful extent, by the employment of a single U, of double strength, placed in the center of the seat lengthwise, from the hind end of which an iron bar may extend laterally on either side and be attached to the half springs, said bar being sufficiently long to allow the hinder half springs to be a sufficient distance apart to give the necessary stability sidewise to the seat or body; to the front leg of said U a single half spring of double strength may be attached and project forward over the center of the axle. This would allow of a longer spring and dispense with the necessity of the bolster, or, a bar, of more or less length, may extend laterally from the front end of the U, and be attached to two half springs the other ends resting on a bolster over the axle as in the construction first described.

*Ease of motion.*—In perfecting my improvement it was a matter of much difficulty to attain the desirable ease of motion while the usual distance between the fore and hind axles was preserved, and a number of buggy wagons were built by me in succession before I obtained a satisfactory result. Finally I overcame the difficulty by making the steel plates comprising each spring thinner than they had ever been made in the common buggy wagon, increasing the number of the plates, or their width, to give the requisite security against breakage or permanent set. Thus, instead of using plates ¼ inch thick which is about the usual thickness used in buggy wagons I used plates but ⅛ inch in thickness. The elasticity of steel being inversely as the square of the thickness, I thus obtained more than double the elasticity per equal lengths, without a permanent set. This afforded me the usual elasticity with a single spring, which had necessarily to be short, to prevent the axles from being spread unusually far apart. In the ordinary buggy wagon the use of a compound or elliptic spring has been found necessary to produce the desirable amount of elasticity or ease of motion.

*Simplicity of construction.*—This is a result of the use of the side pieces composed of the bent bars and springs heretofore described, enabling me to dispense with the perch and hounds the tray or common body for supporting the seat and the usual springs, and also with a number of parts and bolts and fastenings due to the use of the ordinary perch hounds and springs.

What I claim as new and desire to secure by Letters Patent in the improvements above described is—

The combination of bent bars and springs arranged substantially as herein described to connect the fore and hind axles, support the seat with both the requisite firmness and elasticity, and to permit the front wheels to pass under the seat in turning short round.

The buggy herein described in the form preferred by me is exhibited in the accompanying drawings which are to be taken as a part of this specification.

THOS. WINANS.

Witnesses:
 JNO. H. B. SAHOLE,
 JAS B. WRIGHT.